United States Patent
Sato et al.

(10) Patent No.: US 11,551,713 B2
(45) Date of Patent: *Jan. 10, 2023

(54) BASE FOR MAGNETIC RECORDING MEDIUM, MAGNETIC RECORDING MEDIUM, AND MAGNETIC STORAGE APPARATUS

(71) Applicant: SHOWA DENKO K.K., Tokyo (JP)

(72) Inventors: Wataru Sato, Tochigi (JP); Hideki Tomosue, Tochigi (JP); Norihisa Watanabe, Tochigi (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,861

(22) Filed: Jul. 28, 2021

(65) Prior Publication Data

US 2022/0036921 A1 Feb. 3, 2022

(30) Foreign Application Priority Data

Aug. 3, 2020 (JP) .............................. JP2020-131784

(51) Int. Cl.
*G11B 5/73* (2006.01)
*G11B 5/706* (2006.01)

(52) U.S. Cl.
CPC ........ *G11B 5/7371* (2019.05); *G11B 5/70615* (2013.01); *G11B 5/73913* (2019.05); *G11B 5/73919* (2019.05)

(58) Field of Classification Search
None
See application file for complete search history.

(56) References Cited

U.S. PATENT DOCUMENTS

| | | | |
|---|---|---|---|
| 5,091,225 A * | 2/1992 | Goto ................... | G11B 5/73913 427/205 |
| 8,668,953 B1 * | 3/2014 | Buechel-Rimmel ......... | G11B 5/7369 427/419.1 |
| 2014/0072829 A1 * | 3/2014 | Inaba ................... | G11B 5/8404 428/650 |
| 2022/0036920 A1 * | 2/2022 | Sato ....................... | G11B 5/7371 |

FOREIGN PATENT DOCUMENTS

JP H05-266457 10/1993

* cited by examiner

*Primary Examiner* — Kevin M Bernatz
(74) *Attorney, Agent, or Firm* — IPUSA, PLLC

(57) ABSTRACT

A base for a magnetic recording medium, includes an aluminum alloy substrate, and a nickel alloy film provided on at least one principal surface of the aluminum alloy substrate. The nickel alloy film includes Mo in a range of 0.5 wt % to 3 wt %, P in a range of 11 wt % to 15 wt %, and Fe in a range of 0.0001 wt % to 0.001 wt %.

12 Claims, 4 Drawing Sheets

BASE FOR MAGNETIC RECORDING MEDIUM, MAGNETIC RECORDING MEDIUM, AND MAGNETIC STORAGE APPARATUS

CROSS-REFERENCE TO RELATED APPLICATIONS

This application is based upon and claims priority to Japanese Patent Application No. 2020-131784 filed on Aug. 3, 2020, the entire contents of which are incorporated herein by reference.

BACKGROUND OF THE INVENTION

1. Field of the Invention

The present disclosure relates to bases for magnetic recording media, magnetic recording media, and magnetic storage apparatuses.

2. Description of the Related Art

For example, aluminum substrates, glass substrates, or the like are widely used as bases for magnetic recording media (that is, substrates for magnetic recording media). When using the aluminum substrate as the base for the magnetic recording medium, a non-magnetic film, such as a NiP-based alloy film or the like, is formed on the surface of the aluminum substrate, in order to increase the surface hardness, stiffness, or the like of the base for the magnetic recording medium.

For example, Japanese Laid-Open Patent Publication No. H05-266457 (now Japanese Patent No. 2,848,103) proposes an example of the base for the magnetic recording medium having the non-magnetic film formed on the aluminum substrate, wherein the non-magnetic film is an amorphous Ni—P—Mo alloy film having a composition including 85.2 weight percent (wt %) to 89.1 wt % of nickel (Ni), 10.7 wt % to 13 wt % of phosphorous (P), and 0.2 wt % to 1.8 wt % of molybdenum (Mo).

Along with the recent size reduction, thinning, and increased recording density of the magnetic recording media, thermally assisted (or heat assisted) magnetic recording media, that can realize a high surface recording density on the order of approximately 1 Tbit/inch$^2$, are regarded as promising next-generation magnetic recording media which can increase the storage capacity. The thermally assisted magnetic recording medium includes a magnetic layer formed on the surface of the based for the magnetic recording medium substrate, wherein the magnetic layer includes an alloy having an L1$_0$ crystal structure, such as FePt alloys, CoPt alloys, or the like. In order to form such a magnetic layer on the surface of the base for the magnetic recording medium, it is necessary to heat the base for the magnetic recording medium to a temperature higher than 300° C.

However, according to the technique proposed in the Japanese Laid-Open Patent Publication No. H05-266457 (now Japanese Patent No. 2,848,103), when the Ni—P—Mo alloy film is heated to the temperature higher than 300° C., the composition of the Ni—P—Mo alloy film easily changes, and the heat resistance is insufficient. For this reason, the number of micro-bulges generated at the surface of the Ni—P—Mo alloy film may increase, and the surface waviness of the Ni—P—Mo alloy film may increase, thereby increasing the possibility of deteriorating a smoothness of the surface of the Ni—P—Mo alloy film. If the surface of the base for the magnetic recording medium has a poor smoothness, there is a problem in that a magnetic head and the magnetic recording medium may easily make contact with each other during operation of the magnetic storage apparatus.

SUMMARY OF THE INVENTION

Accordingly, one object according to one aspect of the embodiments is to provide a base for a magnetic recording medium, having a high heat resistance, and to provide a magnetic recording medium having such a base for the magnetic recording medium, and to provide a magnetic storage apparatus having such a magnetic recording medium.

According to one aspect of the embodiments, a base for a magnetic recording medium, includes an aluminum alloy substrate; and a nickel alloy film provided on at least one principal surface of the aluminum alloy substrate, wherein the nickel alloy film includes Mo in a range of 0.5 wt % to 3 wt %, P in a range of 11 wt % to 15 wt %, and Fe in a range of 0.0001 wt % to 0.001 wt %.

According to still another aspect of the embodiments, a magnetic recording medium includes the base for the magnetic recording medium described above; and a magnetic layer, provided on the nickel alloy film of the base, and including a FePt alloy or a CoPt alloy having a L1$_0$ crystal structure.

According to a further aspect of the embodiments, a magnetic storage apparatus includes the magnetic recording medium described above; and a magnetic head configured to write information to and read information from the magnetic recording medium.

Other objects and further features of the present invention will be apparent from the following detailed description when read in conjunction with the accompanying drawings.

DESCRIPTION OF THE PREFERRED EMBODIMENTS

Figure 1:
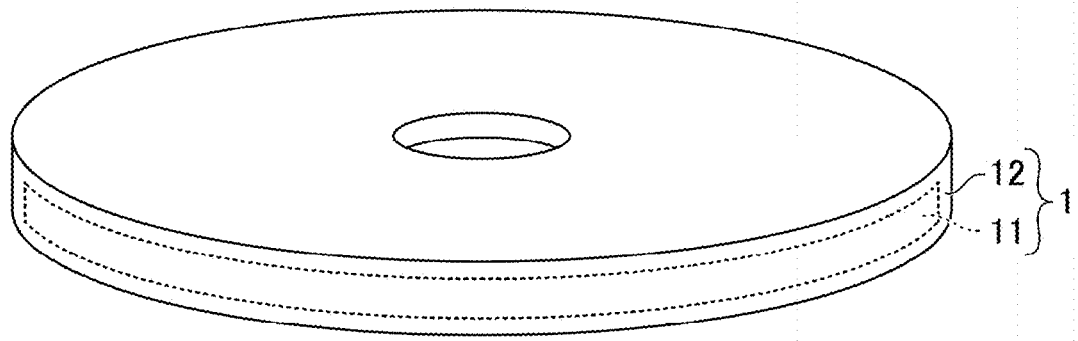
FIG. 1 is a perspective view illustrating an example of a base for a magnetic recording medium according to one embodiment of the present invention.

A description will be given of embodiments and exemplary implementations of a base for a magnetic recording medium, the magnetic recording medium, and a magnetic storage apparatus according to the present invention, by referring to the drawings. In order to facilitate understanding of the description, the same constituent elements are designated by the same reference numerals in the drawings, and a repeated description of the same constituent elements will be omitted. Further, the constituent elements in the drawings are not drawn to scale, and the scale may differ among the drawings. Unless otherwise indicated, a numerical range indicated as "a range of V1 to V2" may include the lower limit value V1 of the range, and may also include the upper limit value V2 of the range.

<Base for Magnetic Recording Medium>

Figure 2:
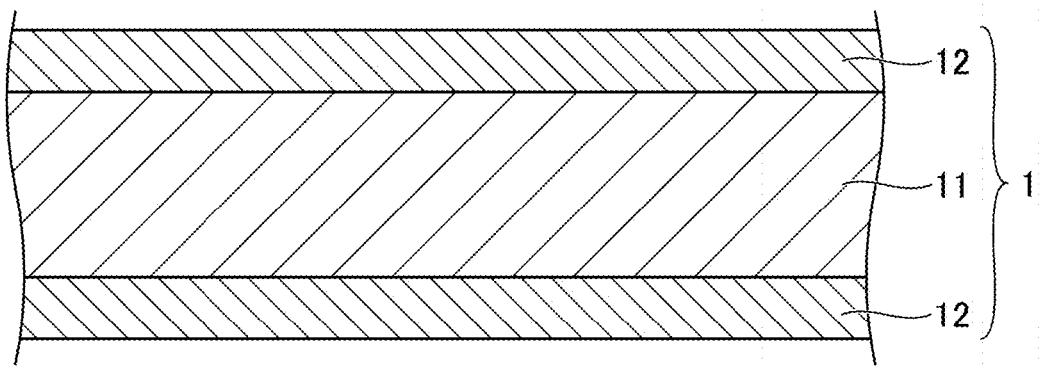
FIG. 2 is a cross sectional view illustrating an example of a portion of the base for the magnetic recording medium.

The base for the magnetic recording medium according to one embodiment of the present invention will be described. FIG. 1 is a perspective view illustrating an example of the base for the magnetic recording medium according to one embodiment of the present invention, and FIG. 2 is a cross sectional view illustrating an example of a portion of the base for the magnetic recording medium. As illustrated in FIG. 1 and FIG. 2, a base 1 for the magnetic recording medium (hereinafter also referred to as a "medium base 1") according to this embodiment includes an aluminum (Al) alloy substrate 11 for the magnetic recording medium, and a nickel (Ni) alloy film 12 formed on surfaces of the aluminum alloy substrate 11. The medium base 1 may be formed to a disk shape, and may have an opening at a center thereof in a plan view of the medium base 1.

[Aluminum Alloy Substrate]

The aluminum alloy substrate 11 may include additional elements. The additional elements include magnesium (Mg) and chromium (Cr), with aluminum (Al) as a remainder, and may further include unavoidable impurities.

Mg has a function to improve the mechanical strength of the aluminum alloy substrate 11. A Mg-content is preferably in a range of 2 wt % to 7 wt %, and more preferably in a range of 3.5 wt % to 5.0 wt %. When the Mg-content falls within the preferable ranges described above, it is possible to obtain a material reinforcing effect at high temperatures, and facilitate manufacturing steps or processes, such as hot extrusion or the like. In addition, because deterioration of the ductility and tenacity can be reduced, the extrusion or the like can be performed positively or reliably.

Cr has a function to improve the strength at high temperatures, and improve the extrusion. A Cr-content is preferably in a range of 0.02 wt % to 0.3 wt %, and more preferably in a range of 0.05 wt % to 0.25 wt %. When the Cr-content falls within the preferable ranges described above, it is possible to improve the strength at high temperatures, and facilitate the extrusion.

The aluminum alloy substrate 11 may include, as the additional elements, one or more elements selected from a group consisting of Zn, Mn, Ti, Cr, V, Zr, Mo, and Co, in addition to Mg and Cr. The aluminum alloy substrate 11 may include Zn in a range of 0.01 wt % to 0.5 wt %, and may include, in addition to Zn, one or more elements selected from Mn, Ti, Cr, V, Zr, Mo, and Co in a range of 0.01 wt % to 0.5 wt %.

The unavoidable impurities refer to impurities which are inevitably mixed into the raw material and/or during the manufacturing process. Examples of the unavoidable impurities may include B, P, or the like. In this embodiment, when the unavoidable impurity is B or P, a B-content may be less than 0.01 wt %, and a P-content may be less than 0.1 wt %, for example.

The aluminum alloy substrate 11 may be formed to a disk shape, and may have an opening at a center thereof in a plan view of the aluminum alloy substrate 11.

The aluminum alloy substrate 11 is preferably accommodatable inside a standardized magnetic storage apparatus (for example, a hard disk drive) or the like. For this reason, a diameter, an opening, and a thickness of the aluminum alloy substrate 11 may be arbitrarily selected according to the size of the magnetic storage apparatus.

The diameter of the aluminum alloy substrate 11 is preferably in a range of 53 mm to 97 mm, for example. The aluminum alloy substrate 11 may be used for a magnetic recording medium of the magnetic storage apparatus. The magnetic recording medium may be required to be accommodated inside the standardized magnetic storage apparatus, such as a 2.5-inch magnetic storage apparatus, a 3.5-inch magnetic storage apparatus, or the like, for example. The 2.5-inch magnetic storage apparatus accommodates a magnetic recording medium having a maximum diameter of approximately 67 mm, and the 3.5-inch magnetic storage apparatus accommodates a magnetic recording medium having a maximum diameter of approximately 97 mm. Hence, the magnetic recording medium may be accommodated inside an arbitrary standardized magnetic storage apparatus if the aluminum alloy substrate 11 has a diameter in a range of 53 mm to 97 mm.

A diameter of the opening of the aluminum alloy substrate 11, that is, an inner diameter of the aluminum alloy substrate 11, is preferably in a range of 19 mm to 26 mm, for example. A drive shaft of the magnetic storage apparatus is inserted into the opening of the medium base 1. If the diameter of the opening of the medium base 1, that is, an inner diameter of the medium base 1, is in the range of 19 mm to 26 mm, the drive shaft of the arbitrary standardized magnetic storage apparatus may be inserted into the opening of the medium base 1.

The thickness of the aluminum alloy substrate 11 is preferably in a range of 0.2 mm to 0.9 mm, for example. In the magnetic storage apparatuses, it is effective to increase the number of magnetic recording media accommodated inside a casing of the magnetic storage apparatus, when increasing the storage capacity of the magnetic storage apparatus. For example, in the existing 3.5-inch magnetic storage apparatuses, a maximum of five magnetic recording media, respectively having a thickness of 1.27 mm, may be accommodated inside the casing. However, the storage capacity of the magnetic storage apparatus can be increased if six or more magnetic recording media are accommodatable inside the casing. For this reason, if the thickness of the aluminum alloy substrate 11 is in the range of 0.2 mm to 0.9 mm, a large number of magnetic recording media can be accommodated inside the casing of the magnetic storage apparatus.

(Method for Manufacturing Aluminum Alloy Substrate)

The aluminum alloy substrate 11 may be manufactured by known methods. The aluminum alloy substrate 11 may be manufactured by a method including a casting step or process which forms an aluminum alloy ingot, a rolling step or process which rolls the aluminum alloy ingot into a plate shape to obtain an aluminum alloy plate, and a forming step or process which forms the aluminum alloy plate into the aluminum alloy substrate 11, for example.

During the casting step or process, the aluminum alloy material, including components with adjusted quantities, is heated and melted to cast the aluminum alloy, thereby forming the aluminum alloy ingot.

Examples of the method for casting the aluminum alloy include known methods for forming the aluminum alloy ingot, such as direct chilled casting (DC casting) methods, continuous casting (CC) methods, or the like, for example.

The DC casting method pours molten aluminum alloy into a mold, and causes the mold to make direct contact with cooling water, thereby casting the aluminum alloy ingot. The CC method continuously pours the molten aluminum alloy into the mold, and causes forced cooling inside the mold, thereby casting the aluminum alloy ingot.

In the rolling step or process, the aluminum alloy ingot obtained by the casting step or process described above is rolled into the plate shape, thereby obtaining the aluminum alloy plate.

The method for rolling the aluminum alloy ingot is not particularly limited, and methods such as the hot rolling, cold rolling, or the like may be used, for example. The rolling conditions are not particularly limited, and may be conditions that are conventionally employed when rolling the aluminum alloy ingot.

In the forming step or process, the aluminum alloy plate obtained by the rolling step or process described above is formed into the aluminum alloy substrate 11.

First, the aluminum alloy plate obtained by the rolling step or process is punched into a disk shape to obtain an aluminum alloy disk. Next, the aluminum alloy disk is heated for 0.5 hours to 5 hours at a temperature in a range of 300° C. to 500° C., to perform annealing. The annealing relieves intrinsic strain of the aluminum alloy disk can be alleviated, thereby enabling the stiffness of the resulting aluminum alloy substrate to be adjusted to fall within an appropriate range.

Thereafter, top, bottom, and end surfaces of the annealed aluminum alloy disk are cut by a cutting process using a cutting tool. As a result, the aluminum alloy substrate 11, having the opening with the prescribed dimensions at the center thereof, is obtained.

For example, a diamond bit (or tool) may be used as the cutting tool.

The annealing may be performed after the cutting process.

[Nickel Alloy Film]

As described above, the nickel alloy film 12 is famed on the surfaces of the aluminum alloy substrate 11. In other words, the nickel alloy film 12 is formed on both principal surfaces (that is, top and bottom surfaces), and the end surfaces of the aluminum alloy substrate 11. Of course, the nickel alloy film 12 may be formed on only one of the principal surfaces, such as the top surface, of the aluminum alloy substrate 11, for example.

The nickel alloy film 12 has functions to increase the hardness of the surfaces of the medium base 1, improve the strength of the medium base 1, and planarize the surfaces of the medium base 1.

The nickel alloy film 12 is a plated film of a NiMoP-based alloy including Mo, P, and Fe as additional elements, with Ni as a remainder. By forming the nickel alloy film 12 by the plated film of the NiMoP-based alloy, it is possible to improve the hardness and flatness of the surfaces of the medium base 1.

The nickel alloy film 12 may include one or more elements selected from a group consisting of Cr, Zn, Ba, and Pb, as additional elements, in addition to Mo, P, and Fe. A content of such additional elements may be less than 0.001 wt %.

The nickel alloy film 12 may include unavoidable impurities, in addition to the additional elements, with Ni as the remainder.

As the additional element, a Mo-content may be in a range of 0.5 wt % to 3 wt %, and more preferably in a range of 0.5 wt % to 1.5 wt %. If the Mo-content is less than 0.5 wt %, the heat resistance of the nickel alloy film 12 deteriorates. On the other hand, if the Mo-content exceeds 3 wt %, amorphization of the nickel alloy film 12 is inhibited. If the Mo-content falls within the range of 0.5 wt % to 3 wt %, it is possible to improve the heat resistance of the nickel alloy film 12, and also promote the amorphization of the nickel alloy film 12.

As the additional element, a P-content may be in a range of 11 wt % to 15 wt %, and more preferably in a range of 12 wt % to 13 wt %. If the P-content is less than 11 wt %, the amorphization of the nickel alloy film 12 is inhibited. On the other hand, if the P-content exceeds 15 wt %, the heat resistance of the nickel alloy film 12 deteriorates. If the P-content falls within the range of 11 wt % to 15 wt %, it is possible to improve the heat resistance of the nickel alloy film 12, and also promote the amorphization of the nickel alloy film 12.

As the additional element, a Fe-content may be in a range of 0.0001 wt % to 0.001 wt %, and more preferably in a range of 0.0002 wt % to 0.0005 wt %. If the Fe-content is less than 0.0001 wt %, the heat resistance of the nickel alloy film 12 cannot be improved. On the other hand, if the Fe-content exceeds 0.001 wt %, the crystallization of the nickel alloy film 12 progresses excessively, thereby increasing the size of micro-bulges generated at the surface of the medium base 1, and more easily forming micro-bulges having a height greater than or equal to 1 nm. The heat resistance of the nickel alloy film 12 can further be improved if the Fe-content falls within the range of 0.0001 wt % to 0.001 wt %. The present inventors consider the following to be the reasons for the above. That is, because Mo in the nickel alloy film 12 bonds to Fe mainly through bonding with oxygen, even if the magnetic layer of the magnetic recording medium is heated to a temperature exceeding 300° C. when forming the magnetic layer on the surface of the medium base 1, it is possible to reduce diffusion of Mo into the nickel alloy film 12. Accordingly, because crystallization of the NiMoP-based alloy forming the nickel alloy film 12 can be reduced, it is possible to reduce magnetization of the NiMoP-based alloy caused by the heating, and to reduce an increase in a saturation magnetic flux density of the nickel alloy film 12. Further, when the crystallization of the NiMoP-based alloy forming the nickel alloy film 12 occurs, micro-bulges are generated at the surface of the nickel alloy film 12, and a magnitude of minute surface waviness may easily increase. Because the medium base 1 according to this embodiment can reduce the crystallization of the NiMoP-based alloy forming the nickel alloy film 12, it is possible to reduce the generation of the micro-bulges at the surface of the nickel alloy film 12, and to reduce the minute surface waviness. The minute surface waviness can be measured by a known measuring device, such as an atomic force microscope (AFM) or the like.

In this embodiment, the micro-bulges having a height greater than or equal to 1 nm, generated at the surface of the nickel alloy film 12 after heating the medium base 1 for 20 minutes at 320° C., is preferably less than 0.060 bulges/cm$^2$, and more preferably 0.050 bulges/cm$^2$ or less. In addition, the medium base 1 may be heated in a vacuum, or in an environment other than the vacuum.

A thickness of the nickel alloy film 12 is preferably in a range of 5 to 20 µm, and more preferably in a range of 10 µm to 17 µm. If the thickness of the nickel alloy film 12 falls within the preferable ranges described above, it is possible to improve the hardness of the nickel alloy film 12, and to increase the strength of the medium base 1. In addition, because it is possible to smoothen the surface of the nickel alloy film 12 by absorbing the surface irregularities of the aluminum alloy substrate 11, fluttering of the medium base 1 can be reduced. Further, it is possible to reduce the weight of the medium base 1.

[Method for Manufacturing Medium Base for Magnetic Recording Medium]

A method for manufacturing the medium base 1 according to this embodiment will be described. The method for manufacturing the medium base 1 according to this embodiment includes a forming step (or process) of forming the nickel alloy film 12 on the aluminum alloy substrate 11 by plating, and a polishing step (or process) of polishing the surface of the aluminum alloy substrate 11 formed with the nickel alloy film 12.

(Film Forming Process)

The nickel alloy film 12 is formed on the surface of the aluminum alloy substrate 11 by plating.

A known plating method may be used for the plating, and electroless plating is preferably used for the plating.

First, a NiMoP plating solution is prepared by adding Mo salt to a NiP plating solution.

A plating solution, including nickel sulfate as a nickel source, and hypophosphite as a phosphorus source, for example, may be used as the NiP plating solution.

Sodium molybdate, potassium molybdate, ammonium molybdate, or the like may be used as the Mo salt.

Next, Fe salt is added to the NiMoP plating solution, to prepare a plating solution for forming a NiMoP-based alloy plated film.

Iron acetate, iron sulfate, ammonium iron sulfate, or the like may be used as the Fe salt.

The thickness of the nickel alloy film 12 may be adjusted according to plating conditions, such as pH and temperature of the plating solution for forming the NiMoP-based alloy plated film, a dipping time (plating time) of the aluminum alloy substrate 11 into the plating solution for forming the NiMoP-based alloy plated film, or the like.

The pH of the plating solution for forming the NiMoP-based alloy plating is preferably in a range of 5.0 to 8.6. If the pH falls within the range of 5.0 to 8.6, it is possible to stably form the nickel alloy film 12, including Mo, P, and Fe in the amorphous state in Ni.

The temperature of the plating solution for forming the NiMoP-based alloy plated film is preferably in a range of 70° C. to 100° C., and more preferably in a range of 85° C. to 95° C. If the temperature of the plating solution for forming the NiMoP-based alloy plated film falls within the range of 70° C. to 100° C., it is possible to reduce a growth variation of the nickel alloy film 12, and stably foil the nickel alloy film 12 having a reduced thickness variation.

The plating time is preferably in a range of 90 minutes to 150 minutes. If the plating time falls within the range of 90 minutes to 150 minutes, it is possible to sufficiently grow the nickel alloy film 12 to the thickness in the range of 5 μm to 20 μm.

The aluminum alloy substrate having the nickel alloy plated film formed thereon is preferably subjected to a heat treatment. As a result, it is possible to increase the hardness of the nickel alloy film 12, and further increase the stiffness (Young's modulus) of the medium base 1. The heating temperature is preferably 300° C. or higher.

(Polishing Process)

The surface of the aluminum alloy substrate having the nickel alloy plated film formed thereon by the film forming step (or process), is polished by the polishing step (or process). From a viewpoint of simultaneously achieving improvement in a surface quality, such as a smooth and scratch-free surface, and improvement in a productivity, the polishing process preferably employs a multi-stage polishing process which includes two or more polishing steps (or processes) using a plurality of independent grinders. For example, the polishing process may include a coarse polishing step (or process) which uses a first grinder to polish while supplying a polishing liquid including alumina abrasive grains, and a fine polishing step (or process) which uses a second grinder to polish while supplying a polishing liquid including colloidal silica abrasive grains after cleaning the polished aluminum alloy substrate.

Figure 3:
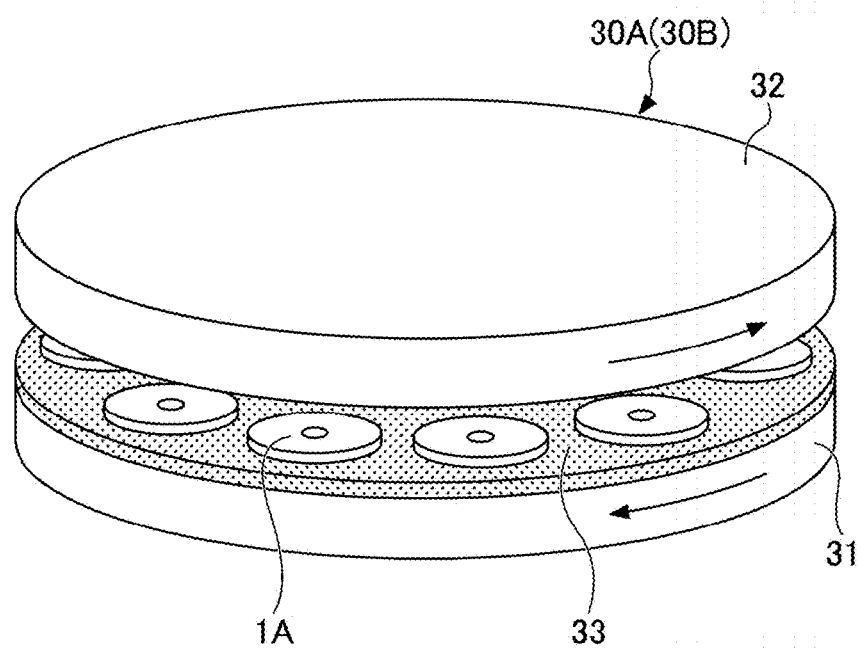
FIG. 3 is a perspective view illustrating an example of a grinder which may be used in a polishing process.

FIG. 3 is a perspective view illustrating an example of the grinder which may be used in the polishing process. As illustrated in FIG. 3, a first grinder 30A (or a second grinder 30B) includes a pair of upper and lower platens 31 and 32. The pair of platens 31 and 32 are rotated in mutually opposite directions around an axis, in a state where a plurality of aluminum alloy substrates 1A having the nickel alloy plated film formed thereon are sandwiched between the pair of platens 31 and 32. Thus, both the upper and lower surfaces of each of the plurality of the aluminum alloy substrates 1A having the nickel alloy film formed thereon can be polished by polishing pads 33 provided on the pair of platens 31 and 32.

By polishing the surfaces of the aluminum alloy substrates 1A having the nickel alloy plated film formed thereon, the medium base 1 according to this embodiment can be obtained, as illustrated in FIG. 1 and FIG. 2.

Accordingly, the medium base 1 includes the aluminum alloy substrate 11, and the nickel alloy film 12, wherein the nickel alloy film 12 includes Mo in the range of 0.5 wt % to 3 wt %, P in the range of 11 wt % to 15 wt %, and Fe in the range of 0.0001 wt % to 0.001 wt %. By including Fe in the range of 0.001 wt % to 0.1 wt %, it is possible to reduce the diffusion of Mo included in the nickel alloy film 12 even when the medium base 1 is heated to the temperature exceeding 300° C., thereby reducing the crystallization of the nickel alloy film 12, and reducing the magnetization of the nickel alloy film 12 caused by the heating. For this reason, the medium base 1 can reduce the saturation magnetic flux density to 0.500 Gauss or less, for example. The saturation magnetic flux density can be measured by a known measuring device, such as a vibrating sample magnetometer (VSM) or the like.

In addition, by heating the medium base 1 to the temperature exceeding 300° C., it is possible to reduce the height of the minute surface waviness generated on the surface of the medium base 1, and reduce the number of micro-bulges generated at the surface of the medium base 1. In order to increase the recording density of the magnetic recording medium when using the medium base 1 for the magnetic recording medium, a floating height of the magnetic head with respect to the magnetic recording medium during operation of the magnetic storage apparatus needs to be set extremely small, and for this reason, the surface of the medium base 1 needs to be extremely smooth. But because the minute surface waviness generated on the surface of the medium base 1 can be reduced, and the number of micro-bulges generated at the surface of the medium base 1 can be reduced, this embodiment can increase the recording density of the magnetic recording medium.

Even if the medium base 1 is heated to the temperature exceeding 300° C., it is possible to achieve a high heat resistance, because the height of the minute surface waviness can be reduced while reducing the magnetization, and a density of the micro-bulges can be reduced. The density of the micro-bulges can be determined by a known method, such as a method which analyzes an image obtained by the AFM, for example.

Accordingly, because the medium base 1 can have the high heat resistance suitable for manufacturing a thermally assisted magnetic recording medium which needs to be heated to a high temperature of 320° C., for example, during the manufacture thereof, the medium base 1 can be suitably used as a base for the magnetic recording medium for use in the thermally assisted magnetic recording medium.

The height of the surface waviness generated on the surface of the nickel alloy film 12 can be made to become 0.100 nm or less after the medium base 1 is heated under a heating condition of 20 minutes at 320° C. Thus, because the medium base 1 can increase the smoothness of the surface of the nickel alloy film 12, the recording density of the magnetic recording medium using the medium base 1 can be increased.

The number of micro-bulges generated at the surface of the nickel alloy film 12 and having the height of 1 nm or greater can be made to become 0.050 bulges/cm$^2$ or less after the medium base 1 is heated under a heating condition of 20 minutes at 320° C. Thus, because the medium base 1 can increase the smoothness of the surface of the nickel alloy film 12, the recording density of the magnetic recording medium using the medium base 1 can be increased.

<Magnetic Recording Medium>

Next, the magnetic recording medium applied with the medium base according to this embodiment will be described. In this embodiment, it is assumed for the sake of convenience that the magnetic recording medium is a thermally assisted magnetic recording medium, however, the medium base may of course be similarly applied to other types of magnetic recording media.

The thermally assisted magnetic recording medium has a surface recording density on the order of 1 Tbit/inch$^2$, for example, and can have a high storage capacity. A thermally assisted magnetic recording method irradiates near-field light, microwave, or the like on the surface of the thermally assisted magnetic recording medium, to reduce a coercivity of the thermally assisted magnetic recording medium and write magnetic information by locally heating the surface of the thermally assisted magnetic recording medium.

Figure 4:
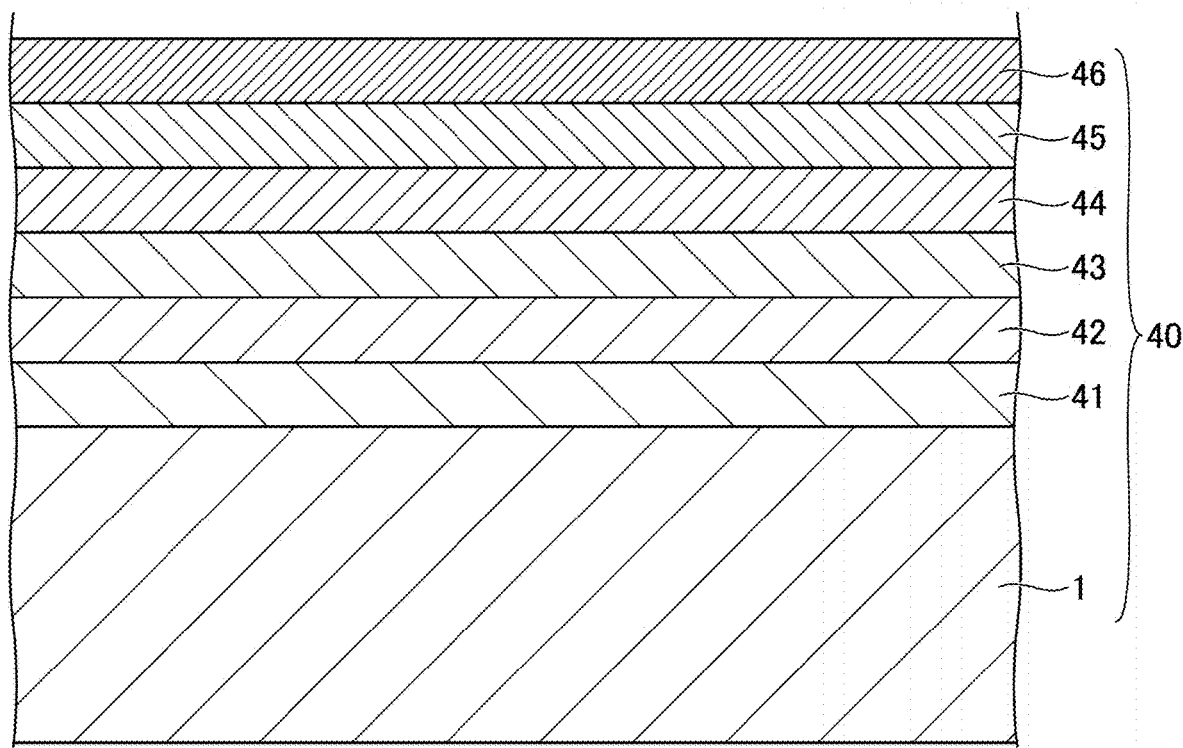
FIG. 4 is a cross sectional view schematically illustrating an example of a thermally assisted magnetic recording medium according to one embodiment of the present invention.

FIG. 4 is a cross sectional view schematically illustrating an example of the thermally assisted magnetic recording medium applied with the medium base 1 according to this embodiment. As illustrated in FIG. 4, a thermally assisted magnetic recording medium 40 includes the medium base 1, a seed layer 41, a first underlayer 42, a second underlayer 43, a magnetic layer 44, a protection layer 45, and a lubricant layer 46 which are laminated 1 in this order.

The seed layer 41, the first underlayer 42, and the second underlayer 43 are preferably lattice-matched with the magnetic layer 44. Such a lattice-matched structure further improves the (001) orientation of the magnetic layer 44.

For example, a (100)-oriented Cr, W, MgO, or the like may be used for the seed layer 41, the first underlayer 42, and the second underlayer 43. By forming the seed layer 41, the first underlayer 42, and the second underlayer 43 of the (100)-oriented Cr, W, MgO, or the like, and laminating these layers 41, 42, and 43, a lattice mismatch among the seed layer 41, the first underlayer 42, and the second underlayer 43 can be reduced to 10% or less.

In order to ensure the (100) orientation of the first underlayer 42 and the second underlayer 43, a Cr layer having a body centered cubic (BCC) crystal structure, a Cr alloy layer including Cr as a main component thereof and having the BCC crystal structure, or an alloy layer having a B2 crystal structure, may be further formed under one of the seed layer 41, the first underlayer 42, and the second underlayer 43.

Examples of the Cr alloy forming the Cr alloy layer include Cr—Mn alloys, Cr—Mo alloys, Cr—W alloys, Cr—V alloys, Cr—Ti alloys, Cr—Ru alloys, or the like.

Examples of the alloy having the B2 crystal structure include Ru—Al alloys, Ni—Al alloys, or the like.

An oxide may be added to at least one of the seed layer 41, the first underlayer 42, and the second underlayer 43, to improve the lattice matching with the magnetic layer 44.

Examples of the oxide include oxides of one or more metals selected from a group consisting of Ni, Cr, Mo, Nb, Ta, V, and W. Preferable metal oxides among such oxides of the group include NiO, CrO, $Cr_2O_3$, $CrO_3$, $MoO_2$, $MoO_3$, $Nb_2O_5$, $Ta_2O_5$, $V_2O_3$, $VO_2$, $WO_2$, $WO_3$, $WO_6$, or the like.

An oxide content of at least one of the seed layer 41, the first underlayer 42, and the second underlayer 43 is preferably in a range of 2 mole percent (mol %) to 30 mol %, and more preferably in a range of 10 mol % to 25 mol %. If the oxide content of at least one of the seed layer 41, the first underlayer 42, and the second underlayer 43 falls within the preferable ranges described above, it is possible to further improve the (001) orientation of the magnetic layer 44, and further improve the (100) orientation of at least one of the seed layer 41, the first underlayer 42, and the second underlayer 43.

A CoTi-based alloy having a Ti-content of 50 at %, with Co as a remainder, for example, may be used as the material forming the first underlayer 42. A thickness of the first underlayer 42 is preferably in a range of 30 nm to 100 nm, and more preferably approximately 50 nm, for example.

NiO may be used as the material forming the second underlayer 43, for example. A thickness of the second underlayer 43 is preferably in a range of 3 nm to 10 nm, and more preferably approximately 5 nm, for example.

A known method, such as sputtering or the like, may be used to form the seed layer 41, the first underlayer 42, and the second underlayer 43.

The magnetic layer 44 may be formed by a (001)-oriented magnetic layer including an alloy having a $L1_0$ crystal structure provided on the second underlayer 43.

The alloy having the $L1_0$ crystal structure has a high magnetic anisotropy constant Ku. Examples of the alloy having the $L1_0$ crystal structure include Fe—Pt alloys, Co—Pt alloys, or the like.

In order to promote ordering of the alloy having the $L1_0$ crystal structure and included in the magnetic layer 44, a heat treatment is preferably performed when forming the magnetic layer 44.

Crystal grains of the alloy having the $L1_0$ crystal structure and included in the magnetic layer 44 are preferably magnetically isolated. For this reason, the magnetic layer 44 preferably further includes one or more materials selected from a group consisting of $SiO_2$, $TiO_2$, $Cr_2O_3$, $Al_2O_3$, $Ta_2O_5$, $ZrO_2$, $Y_2O_3$, $CeO_2$, $GeO_2$, MnO, TiO, ZnO, $B_2O_3$, C, B, and BN. By further including such materials in the magnetic layer 44, it becomes possible to more positively isolate the exchange coupling between the crystal grains, and further improve the signal-to-noise ratio (SNR) of the thermally assisted magnetic recording medium 40.

More particularly, the magnetic layer 44 may be formed of a (Fe-45 at % Pt)-8 mol % $SiO_2$-4 mol % $Cr_2O_3$ alloy (an alloy including a $SiO_2$-content of 8 mol %, a $Cr_2O_3$-content of 4 mol %, with a remainder (Pt-content of 45 at %, with Fe as a remainder)), for example.

From a viewpoint of increasing the recording density, an average grain diameter (or average grain size) of the magnetic grains included in the magnetic layer 44 is preferably 10 nm or less. Generally, as the average grain diameter of the magnetic grains decreases, the magnetic layer 44 becomes more easily affected by thermal instability immediately after writing the magnetic information.

The average grain diameter of the magnetic grains may be determined using images observed using a transmission electron microscope (TEM). For example, from the observation image of the TEM, the grain diameter (equivalent to a circle) of 200 magnetic grains may be measured, and a value of the grain diameter at 50% in the cumulative distribution (or grain size distribution D50) may be used as the average grain diameter. An average grain boundary width of the magnetic grains is preferably in a range of 0.3 nm to 2.0 nm.

The magnetic layer 44 may have a multi-layer structure. The magnetic layer 44 may be formed by two or more laminated layers including one or more materials selected from a group consisting of $SiO_2$, $TiO_2$, $Cr_2O_3$, $Al_2O_3$, $Ta_2O_5$, $ZrO_2$, $Y_2O_3$, $CeO_2$, $GeO_2$, MnO, TiO, ZnO, $B_2O_3$, C, B, and BN, and the materials included in each of the laminated layers forming the magnetic layer 44 are preferably different from one another.

A thickness of the magnetic layer 44 is preferably in a range of 1 nm to 20 nm, and more preferably in a range of 3 nm to 15 nm. If the thickness of the magnetic layer 44 falls within the preferable ranges described above, it is possible to improve a reproduced output, reduce an increase in the crystal grain diameters of the crystal grains. If the magnetic layer 44 has the multi-layer structure, the thickness of the magnetic layer 44 refers to a total thickness of all of the laminated layers forming the multi-layer structure.

A known method, such as sputtering or the like, similar to the method used to form the seed layer 41, the first underlayer 42, and the second underlayer 43, may be used to form the magnetic layer 44.

The protection layer 45 is provided on the magnetic layer 44 to protect the magnetic layer 44. The protection layer 45 may make contact with the magnetic layer 44.

A carbon material, such as diamond-like carbon (DLC) or the like, may be used as the material forming the protection layer 45.

Examples of the method for forming the protection layer 45 include a radio frequency-chemical vapor deposition (RF-CVD) method which deposits the layer by decomposing a source gas made of hydrocarbon by a high-frequency plasma, an ion beam deposition (IBD) method which deposits the layer by ionizing the source gas by electrons emitted from a filament, a filtered cathodic vacuum arc (FCVA) method which deposits the layer by using a solid carbon target without using a source gas, or the like.

A thickness of the protection layer 45 is not particularly limited, but is preferably in a range of 1 nm to 6 nm, for example. If the thickness of the protection layer 45 falls within this preferable range, excellent floating characteristics of the magnetic head can be obtained, and an increase in the magnetic spacing loss can be reduced, thereby reducing the decrease in the SNR of the thermally assisted magnetic recording medium.

The protection layer 45 may be formed of a single layer, or may be formed of a plurality of laminated layers.

The lubricant layer 46 is provided on the protection layer 45, to prevent contamination of the thermally assisted magnetic recording medium 40, and also reduce the friction between the thermally assisted magnetic recording medium 40 and the magnetic head of the magnetic storage apparatus sliding on the thermally assisted magnetic recording medium 40, thereby improving the durability of the thermally assisted magnetic recording medium 40.

The lubricant layer 46 includes perfluoropolyether-based fluororesins, aliphatic hydrocarbon-based resins, or the like, for example. The lubricant layer 46 may be formed using a lubricant film composition including perfluoropolyether-based fluororesins, aliphatic hydrocarbons, or the like, for example.

The thermally assisted magnetic recording medium 40 according to this embodiment can achieve a high recording density by using the medium base 1 described above, because the height of the minute surface waviness on the surface can be reduced while reducing the magnetization, and the density of the micro-bulges generated at the surface can be reduced.

<Magnetic Storage Apparatus>

A magnetic storage apparatus using the magnetic recording medium according to this embodiment will be described. The magnetic storage apparatus according to this embodiment is not particularly limited as long as the magnetic storage apparatus includes one or a plurality of magnetic recording media according to the embodiment described above. In the example described hereinafter, it is assumed for the sake of convenience that the magnetic recording medium of the magnetic storage apparatus is the thermally assisted magnetic recording medium 40 illustrated in FIG. 5.

For example, the magnetic storage apparatus according to this embodiment includes a driving mechanism that drives the thermally assisted magnetic recording medium to rotate in a recording direction, and a thermally assisted magnetic head having a near-field light generator (or near-field light generating element) provided on a tip end thereof. The magnetic storage apparatus further includes a head moving mechanism that moves the thermally assisted magnetic head, and a signal processor that processes signals that are input to the thermally assisted magnetic head to be recorded on the magnetic recording medium, and processes signals that are reproduced from the magnetic recording medium by the thermally assisted magnetic head and output from the thermally assisted magnetic head.

The thermally assisted magnetic head further has a laser generator that generates laser light for heating the thermally assisted magnetic recording medium, and a waveguide that guides the laser light generated from the laser generator to the near-field light generator.

Figure 5:
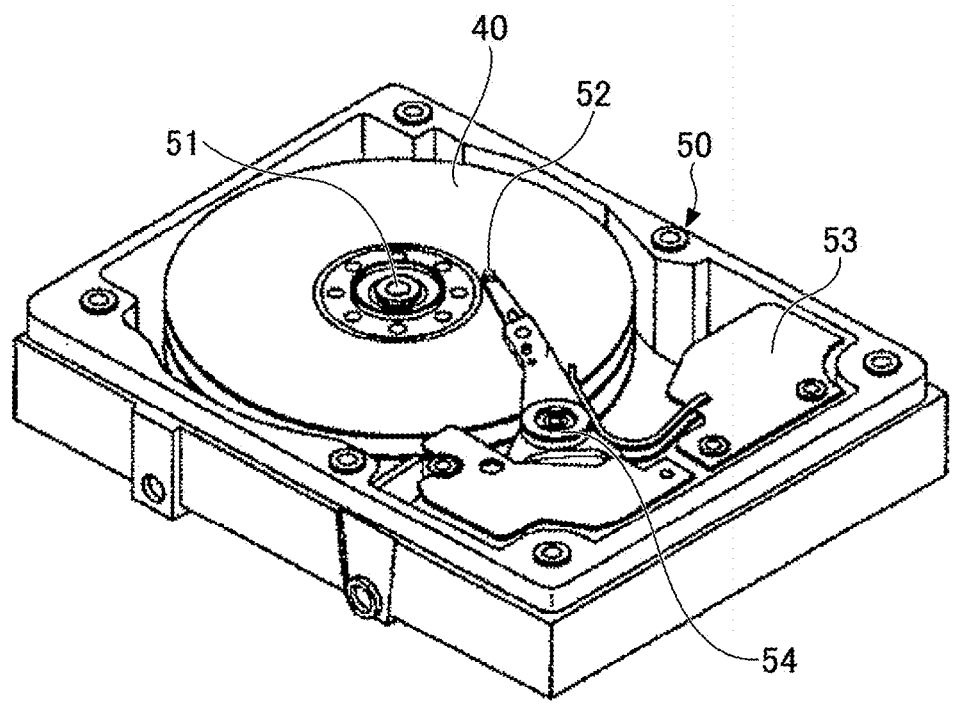
FIG. 5 is a perspective view illustrating an example of a magnetic storage apparatus according to one embodiment of the present invention.

FIG. 5 is a perspective view illustrating an example of the magnetic storage apparatus using the magnetic recording medium according to this embodiment. As illustrated in FIG. 5, a magnetic storage apparatus 50 includes one or a plurality of thermally assisted magnetic recording media 40, a driving mechanism 51 that drives the thermally assisted magnetic recording media 40 to rotate, a thermally assisted magnetic head 52, a head moving mechanism 53 that moves the thermally assisted magnetic head 52, and a signal processor 54. The signal processor 54 processes signals that are input to the thermally assisted magnetic head 52 to be recorded on the thermally assisted magnetic recording medium 40, and processes signals that are reproduced from the thermally assisted magnetic recording medium 40 by the thermally assisted magnetic head 52 and output from the thermally assisted magnetic head 52. For example, the thermally assisted magnetic recording medium 100 may have a disk shape, and in this case, the magnetic storage apparatus 50 may form a Hard Disk Drive (HDD).

Figure 6:
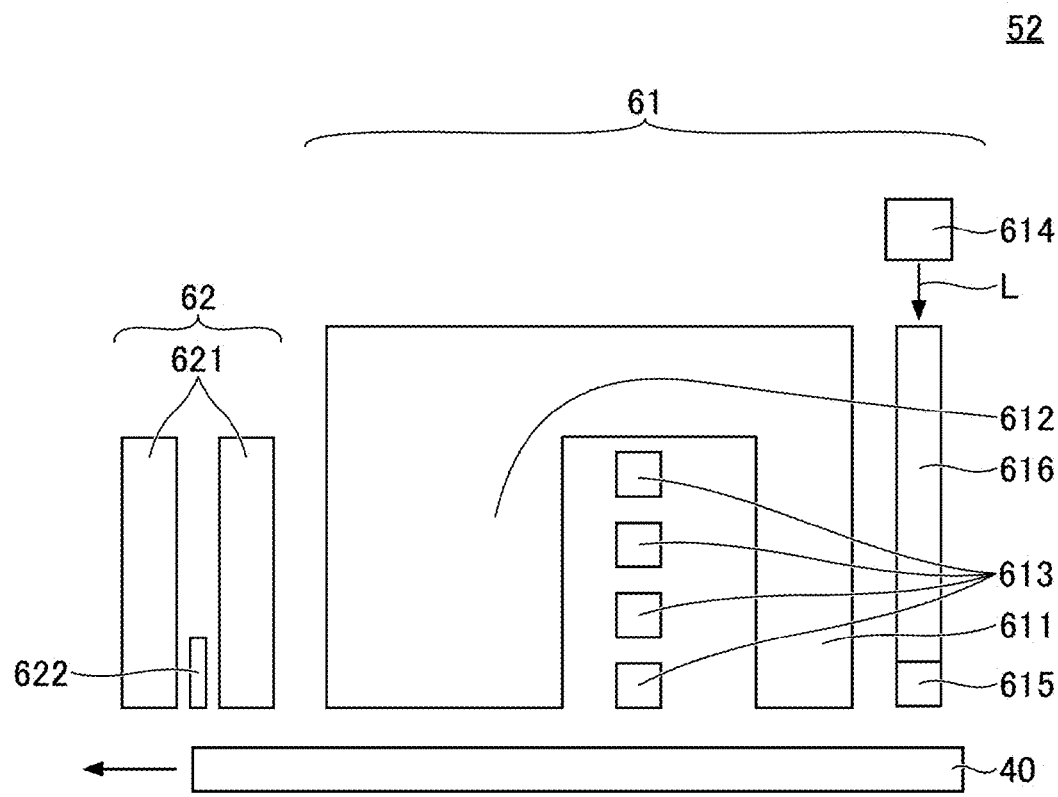
FIG. 6 is a schematic diagram illustrating an example of a magnetic head.

An example of the thermally assisted magnetic head 52 is illustrated in FIG. 6. As illustrated in FIG. 6, the thermally assisted magnetic head 52 includes a recording (or write) head 61 that records (or writes) signals to a corresponding one of the plurality of thermally assisted magnetic recording media 40, and a reproducing (or read) head 62 that reproduces (or reads) signals from the corresponding one of the plurality of thermally assisted magnetic recording media 40.

The recording head 61 includes a main magnetic pole 611, an auxiliary magnetic pole 612, a coil 613 that generates a magnetic field, a laser diode (LD) 614, which is an example of the laser generator and generates laser light L, a near-field light generator (or near-field light generating element) 615 that generates near-field light for heating the thermally assisted magnetic recording medium 100, and a waveguide 616. The waveguide 616 guides the laser light L generated from the laser diode 614 to the near-field light generator 615 that is provided on a tip end of the thermally assisted magnetic head 52.

The reproducing head 62 includes a reproducing element 622, such as a TMR (Tunneling Magneto-Resistive) element or the like, for example, that is sandwiched between a pair of shields 621.

Of course, a microwave assisted magnetic head, which employs a microwave assisted magnetic recording method, may be used in place of the thermally assisted magnetic recording head, which employs the thermally assisted magnetic recording method.

In the magnetic storage apparatus 50 illustrated in FIG. 5, a central portion of the thermally assisted magnetic recording media 40 is mounted on a rotary shaft of a spindle motor included in the driving mechanism 51, for example. The thermally assisted magnetic head 52 records the information on and reproduces the information from the thermally assisted magnetic recording medium 40 which is rotated by the driving mechanism 51, while floating over the surface of the thermally assisted magnetic recording medium 40.

The magnetic storage apparatus 50 according to this embodiment can increase the storage capacity, because the recording density of the thermally assisted magnetic recording medium 40 according to this embodiment can be increased.

[Exemplary Implementations]

Next, exemplary implementations and comparative examples will be described, however, the present disclosure is not limited to the exemplary implementations.

<Manufacturing Aluminum Alloy Substrate>

First, an Al ingot, Mg, Mn, Cr, Si, Fe, and Zn were prepared. Each of the raw materials of the Al ingot, Mg, Mn, Cr, Si, Fe, and Zn had a purity of 99.9 wt % or higher.

An aluminum alloy material was prepared by weighing the raw materials of each of the prepared elements so that the composition after casting becomes Al-4.0 wt % Mg-0.5 wt % Mn-0.1 wt % Cr-0.2 wt % Si-0.3 wt % Fe-0.2 wt % Zn (Mg-content of 4 wt %, Mn-content of 0.5 wt %, Cr-content of 0.1 wt %, Si-content of 0.2 wt %, Fe-content of 0.3 wt %, Zn-content of 0.2 wt %, with Al as a remainder). The aluminum alloy material was melted at 820° C. in atmosphere, and a direct chill (DC) casting method was used to create an aluminum alloy ingot. The casting temperature was 700° C., and the casting speed was 80 mm/minute.

The aluminum alloy ingot prepared in the manner described above was then homogenized at 520° C. for 10 hours. Thereafter, the aluminum alloy ingot was rolled into an aluminum alloy sheet having a thickness of 1.2 mm.

The aluminum alloy sheet was then punched into a disk shape having a diameter of 97 mm and an opening at a center, and the aluminum alloy disk was thereafter annealed at 380° C. for 1 hour. Then, the top, bottom, and end surfaces of the aluminum alloy disk were turned using a diamond bit (or tool), to obtain an aluminum alloy substrate with a diameter of 96 mm and a thickness of 0.8 mm.

<Exemplary Implementation EI1>

[Preparing Medium Base]

(Preparing Nickel Alloy Film)

The aluminum alloy substrate was dipped in a NiMoP-based plating solution, and Ni-0.9 wt % Mo-12.4 wt % P-0.0003 wt % Fe (Mo-content of 0.9 wt %, P-content of 12.4 wt %, Fe-content of 0.0003 wt %, and with Ni as a remainder) was famed on the surface of the aluminum alloy substrate using electroless plating, as a NiMoP-based plated film.

The NiMoP-based plating solution included nickel sulfate, sodium hypophosphite, sodium molybdate, and ferrous acetate (iron II acetate), and sodium citrate and sodium borate were added, as appropriate, to adjust the contents of the components so that the NiMoP-based plated film having the composition described above was obtained. The NiMoP plating solution during the formation of the NiMoP-based plated film was adjusted to a pH of 6 and a plating temperature of 90° C. An immersion (or dipping) time of the aluminum alloy substrate in the NiMoP-based plating solution was 2 hours.

Next, the aluminum alloy substrate having the NiMoP-based plated film formed thereon was heated for 3 minutes at 300° C., to obtain the aluminum alloy substrate having the NiMoP-based plated film with a thickness of 10 μm.

(Polishing)

The surfaces of the aluminum alloy substrate having the NiMoP-based plated film were polished using a 3-stage lapping machine provided with a pair of upper and lower platens as the grinders, to manufacture the medium base (that is, the base for the magnetic recording medium). In this example, suede-type polishing pads, manufactured by Filwell Co., Ltd., were used. For a first polishing stage, alumina abrasive grains having a D50 of 0.5 nm were used. For a second polishing stage, colloidal silica abrasive grains having a D50 of 30 nm were used. For a third polishing stage, colloidal silica abrasive grains having a D50 of 10 nm were used. The polishing time was 5 minutes for each of the first, second, and third stages.

[Evaluation of Heat Resistance]

The medium base manufactured in the manner described above, was heated in a vacuum for 20 minutes at 320° C., and the following parameters were thereafter measured. More particularly, the saturation magnetic flux density of the medium base, the minute surface waviness for a wavelength region in a range of 20 μm to 100 μm, and the density of the micro-bulges having a height of 1 nm or higher generated at the surface of the medium base, were measured. Based on the results of the parameter measurement, the heat resistance of the medium base was evaluated. In the evaluation of the heat resistance of the medium base, the medium base was judged as being "excellent (E)" when the saturation magnetic flux density was 0.10 Gauss or less, the minute surface waviness was 0.100 nm or less, and the density of the micro-bulges was 0.040 bulges/cm$^2$ or less. On the other hand, the medium base was judged as being "poor (P)" when the saturation magnetic flux density exceeded 0.10 Gauss, or the minute surface waviness exceeded 0.100 nm, or the density of the micro-bulges exceeded 0.040 bulges/cm$^2$. Table 1 illustrates the measurement results of the saturation magnetic flux density, the minute surface waviness, and the density of the micro-bulges of the medium base, and the evaluation results of the heat resistance, for each of the exemplary implementations IE1 through IE7 and comparative examples CE1 through CE6.

(Saturation Magnetic Flux Density)

The saturation magnetic flux density of the medium base was measured by the VSM.

(Minute Surface Waviness)

The minute surface waviness of the surface of the medium base in the wavelength region in the range of 20 μm to 100 μm was measured by the AFM.

(Density of Micro-Bulges)

Figure 7A:
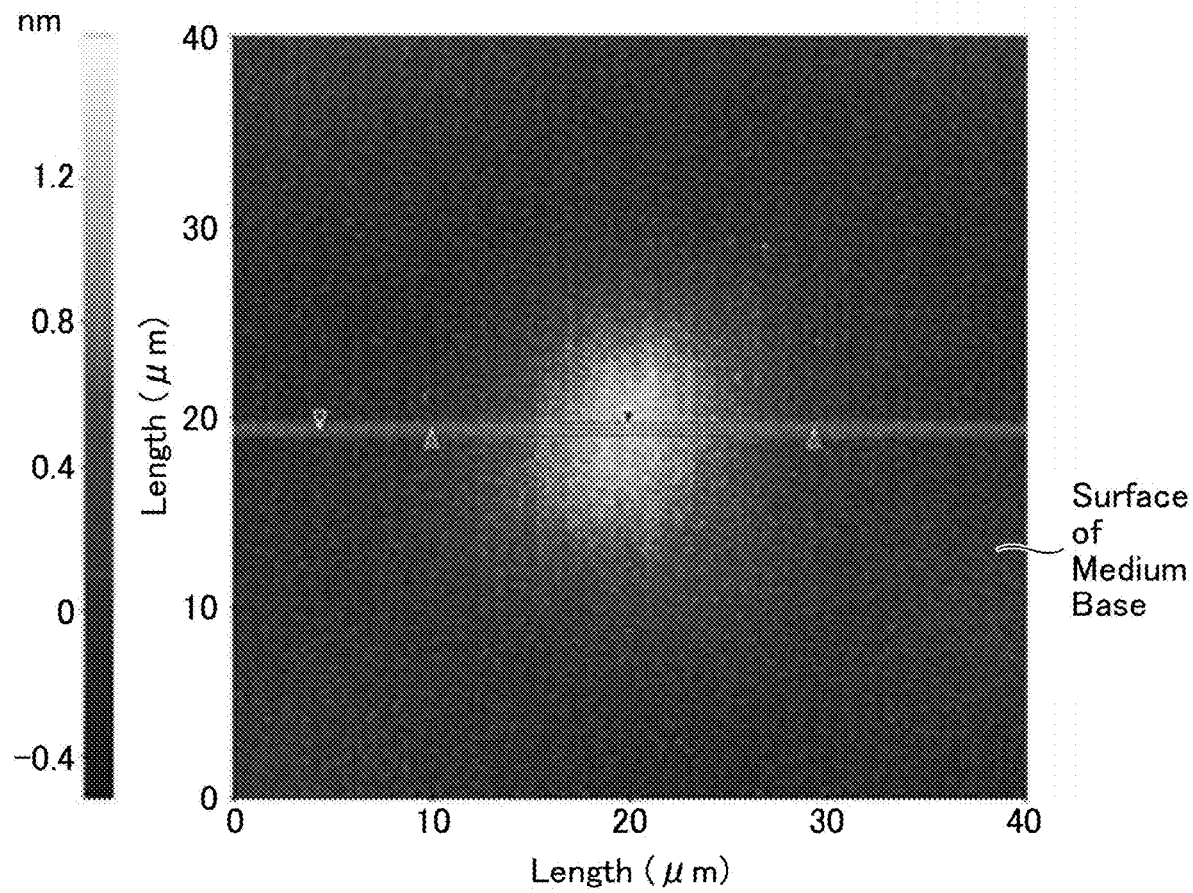
FIG. 7A and FIG. 7B are diagrams illustrating measured micro-bulges generated at a surface of the base for the magnetic recording medium and having a height of 1 nm or greater.
Figure 7B:
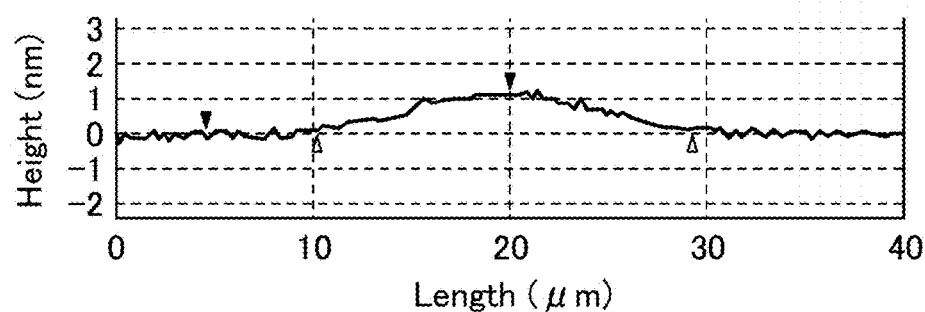

The density of the micro-bulges generated at the surface of the medium base and having the height of 1 nm or greater was measured by analyzing the image obtained by the AFM. FIG. 7A and FIG. 7B illustrate the measured micro-bulges generated at the surface of the medium base and having the height of 1 nm or greater.

<Exemplary Implementations EI2-EI7 & Comparative Examples CE1-CE6>

In the exemplary implementations EI2 through EI7 and the comparative examples CE1 through CE6, the composition of the NiMoP-based plated film was changed from that of the exemplary implementation EI1, as illustrated in Table 1. Otherwise, the measurements for the exemplary implementations EI2 through EI7 and the comparative examples CE1 through CE6 were made in a manner similar to the measurements for the exemplary implementation EI1. The measurement results of the exemplary implementations EI1 through EI7 and the comparative examples CE1 through CE6 are illustrated in Table 1.

ness, and the density of the micro-bulges having the height of 1 nm or higher, by setting the composition of the NiMoP-based plated film to include a Mo-content in a range of 0.5 wt % to 3 wt %, a P-content in a range of 11 wt % to 12.4 wt %, and a Fe-content in a range of 0.0001 wt % to 0.001 wt %, thereby improving the heat resistance. Accordingly, it was confirmed from the measurements and evaluation that the medium base for the magnetic recording medium according to the exemplary implementations EI1 through EI7 can be effectively used for the thermally assisted magnetic recording medium.

According to each of the embodiments and exemplary implementations of the present invention, it is possible to provide a base for a magnetic recording medium, having a high heat resistance, and to provide a magnetic recording medium having such a base for the magnetic recording medium, and to provide a magnetic storage apparatus having such a magnetic recording medium.

Further, the present invention is not limited to these embodiments and exemplary implementations, but various variations, modifications, and substitutions may be made without departing from the scope of the present invention.

What is claimed is:

1. A base for a magnetic recording medium, comprising:
an aluminum alloy substrate; and
a nickel alloy film provided on at least one principal surface of the aluminum alloy substrate, wherein
the nickel alloy film includes Mo in a range of 0.5 wt % to 3 wt %, P in a range of 11 wt % to 15 wt %, and Fe in a range of 0.0001 wt % to 0.001 wt %,

TABLE 1

| | NiMoP-Based Plated Film Composition (wt %) | | | | Saturation Magnetic Flux Density (Gauss) | Minute Surface Waviness (nm) | Density of Micro-Bulges (Bulges/cm$^2$) | Heat Resistance |
|---|---|---|---|---|---|---|---|---|
| | Mo | P | Fe | Ni | | | | |
| EI1 | 0.9 | 12.4 | 0.0003 | Remainder | 0.50 | 0.10 | 0.040 | E |
| EI2 | 0.5 | 12.4 | 0.0003 | Remainder | 0.60 | 0.10 | 0.050 | E |
| EI3 | 3 | 12.4 | 0.0003 | Remainder | 0.30 | 0.09 | 0.020 | E |
| EI4 | 0.9 | 12.4 | 0.0003 | Remainder | 0.50 | 0.10 | 0.040 | E |
| EI5 | 0.9 | 15 | 0.0003 | Remainder | 0.50 | 0.10 | 0.040 | E |
| EI6 | 0.9 | 12.4 | 0.0001 | Remainder | 0.60 | 0.10 | 0.040 | E |
| EI7 | 0.9 | 12.4 | 0.001 | Remainder | 0.50 | 0.10 | 0.040 | E |
| CE1 | 0.4 | 12.4 | 0.0003 | Remainder | 0.70 | 0.11 | 0.060 | P |
| CE2 | 4 | 12.4 | 0.0003 | Remainder | 0.70 | 0.12 | 0.070 | P |
| CE3 | 0.9 | 10 | 0.0003 | Remainder | 0.80 | 0.13 | 0.070 | P |
| CE4 | 0.9 | 15.5 | 0.0003 | Remainder | 0.70 | 0.12 | 0.060 | P |
| CE5 | 0.9 | 12.4 | 0.00008 | Remainder | 1.10 | 0.13 | 0.080 | P |
| CE6 | 0.9 | 12.4 | 0.002 | Remainder | 0.90 | 0.12 | 0.070 | P |

From Table 1, the saturation magnetic flux density of the medium base was 0.60 Gauss or less, the minute surface waviness was 0.10 μm or less, and the density of the micro-bulges having the height of 1 nm or greater was 0.050 bulges/cm$^2$ for each of the exemplary implementations EI1 through EI7. On the other hand, the saturation magnetic flux density of the medium base was 0.70 Gauss or greater, the minute surface waviness was 0.11 μm or greater, and the density of the micro-bulges having the height of 1 nm or greater was 0.060 bulges/cm$^2$ or greater for each of the comparative examples CE1 through CE6.

It was confirmed from the measurements that, unlike the medium bases according to the comparative examples CE1 through CE6, the medium bases according to the exemplary implementations EI1 through EI7 can reduce each of the saturation magnetic flux density, the minute surface wavia height of a minute surface waviness generated on a surface of the nickel alloy film is 0.100 nm or less when the base is heated under a heating condition of 20 minutes at 320° C. during evaluation of the base, and
a number of micro-bulges generated at the surface of the nickel alloy film and having a height of 1 nm or greater is less than 0.060 bulges/cm$^2$ when the base is heated under a heating condition of 20 minutes at 320° C. during evaluation of the base.

2. The base for the magnetic recording medium as claimed in claim 1, wherein
the nickel alloy film is a film of a NiMoP-based alloy including additional elements, with Ni as a remainder, and
the additional elements include first additional elements including Mo, P, and Fe.

3. The base for the magnetic recording medium as claimed in claim 2, wherein
the additional elements further include second additional elements including one or more elements selected from a group consisting of Cr, Zn, Ba, and Pb, and
a content of the second additional elements is less than 0.001 wt %.

4. A magnetic recording medium comprising:
the base for the magnetic recording medium according to claim 3; and
a magnetic layer, provided on the nickel alloy film of the base, and including a FePt alloy or a CoPt alloy having a $L1_0$ crystal structure.

5. A magnetic storage apparatus comprising:
the magnetic recording medium according to claim 4; and
a magnetic head configured to write information to and read information from the magnetic recording medium.

6. A magnetic recording medium comprising:
the base for the magnetic recording medium according to claim 2; and
a magnetic layer, provided on the nickel alloy film of the base, and including a FePt alloy or a CoPt alloy having a $L1_0$ crystal structure.

7. A magnetic storage apparatus comprising:
the magnetic recording medium according to claim 6; and
a magnetic head configured to write information to and read information from the magnetic recording medium.

8. A magnetic recording medium comprising:
the base for the magnetic recording medium according to claim 1; and
a magnetic layer, provided on the nickel alloy film of the base, and including a FePt alloy or a CoPt alloy having a $L1_0$ crystal structure.

9. A magnetic storage apparatus comprising:
the magnetic recording medium according to claim 8; and
a magnetic head configured to write information to and read information from the magnetic recording medium.

10. The magnetic storage apparatus as claimed in claim 9, wherein the nickel alloy film of the base of the magnetic recording medium has a thickness in a range or 5 μm to 20 μm.

11. The magnetic recording medium as claimed in claim 8, wherein the nickel alloy film of the base has a thickness in a range or 5 μm to 20 μm.

12. The base for the magnetic recording medium as claimed in claim 1, wherein the nickel alloy film has a thickness in a range or 5 μm to 20 μm.

* * * * *